(12) United States Patent
Chen et al.

(10) Patent No.: US 7,376,893 B2
(45) Date of Patent: *May 20, 2008

(54) SYSTEMS AND METHODS FOR SENTENCE BASED INTERACTIVE TOPIC-BASED TEXT SUMMARIZATION

(75) Inventors: Francine R. Chen, Menlo Park, CA (US); Thorsten H. Brants, Palo Alto, CA (US); Annie E. Zaenen, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 790 days.

This patent is subject to a terminal disclaimer.

(21) Appl. No.: 10/319,544

(22) Filed: Dec. 16, 2002

(65) Prior Publication Data

US 2004/0117725 A1   Jun. 17, 2004

(51) Int. Cl.
  *G06N 3/00* (2006.01)
(52) U.S. Cl. ...................... 715/254; 715/255
(58) Field of Classification Search ............. 715/530, 715/903, 531, 501.1, 254, 200, 255; 704/9, 704/257; 707/3, 100
See application file for complete search history.

(56) References Cited

U.S. PATENT DOCUMENTS

| 5,384,703 | A | | 1/1995 | Withgott et al. |
| 5,442,778 | A | | 8/1995 | Pedersen |
| 5,689,716 | A | | 11/1997 | Chen |
| 5,745,602 | A | | 4/1998 | Chen et al. |
| 5,778,397 | A | | 7/1998 | Kupiec et al. |
| 5,806,021 | A | | 9/1998 | Chen et al. |
| 5,838,323 | A | * | 11/1998 | Rose et al. .................. 715/526 |
| 5,918,240 | A | | 6/1999 | Kupiec et al. |
| 6,052,657 | A | | 4/2000 | Yamron et al. |
| 6,128,634 | A | | 10/2000 | Golovchinsky et al. |
| 6,205,456 | B1 | * | 3/2001 | Nakao .......................... 715/531 |
| 6,289,304 | B1 | | 9/2001 | Grefenstette |
| 6,775,677 | B1 | | 8/2004 | Ando et al. |
| 2002/0052901 | A1 | * | 5/2002 | Guo et al. .................. 707/531 |
| 2002/0138528 | A1 | | 9/2002 | Gong et al. |

(Continued)

OTHER PUBLICATIONS

Doug Beeferman, Statistical Models for text Segmentation, 1999, CiteSeer, pp. 1-37.*

(Continued)

*Primary Examiner*—Stephen Hong
*Assistant Examiner*—Manglesh M. Patel
(74) *Attorney, Agent, or Firm*—Fay Sharpe LLP

(57) ABSTRACT

Techniques for determining sentence based interactive topic-based summarization are provided. A text to be summarized is segmented. Discrete keyword, key-phrase, n-gram, sentence and other sentence constituent based summaries are generated based on statistical measures for each text segment. Interactive topic-based summaries are displayed with human sensible omitted text indicators such as alternate colors, fonts, sounds, tactile elements or other human sensible display characteristics useful in indicating omitted text. Individual and/or combinations of discrete keyword, key-phrase, n-gram, sentence, noun phrase and sentence constituent based summaries are dynamically displayed to provide an overview of topic and subtopic development within a text. A hierarchical and interactive display of texts based on the use of discrete sentence constituent based summaries which associates expansible and contractible displayed text provides contextualized access to an interactive topic-based text summary and to an original text.

34 Claims, 10 Drawing Sheets

U.S. PATENT DOCUMENTS

| | | |
|---|---|---|
| 2003/0182631 A1 | 9/2003 | Tsochantaridis |
| 2004/0044519 A1 | 3/2004 | Polanyi et al. |
| 2004/0117725 A1 | 6/2004 | Chen et al. |
| 2004/0122657 A1 | 6/2004 | Brants et al. |

OTHER PUBLICATIONS

Jau M. Ponte, Text Segmentation by topic, 1997, CiteSeer, pp. 1-13.*

Jaime G. Carbonnell et al., "The use of MMR, diversity-based reranking for reordering documents and producing summaries" In Research and Deveopment in Information Retrieval. SIGIR-98, pp. 335-336, 1998.

B-W Chang et al., "Fluidly revealing information in fluid documents", In Proceedings of Smart Graphics 2000, AAAI Spring Symposium, Stanford University, 2000.

Freddy Y. Y. Choi et al., "Latent Semantic Analysis for Text Segmentation" In Proceedings of the 2001 Conference on Empirical Methds in Natural Language Processing, pp. 109-117, 2001.

D. Cutting et al., "Scatter/Gather: A cluster-based approach to browsing large document collections", In Proceedings of SIGIR-92, 1992.

A. P. Dempster et al., Maximum Likelihood from incomplete date via the em algorithm, Journal of the Royal Statistical Society, 39(1):1-21, 1977.

Dan Gildea et al., "Topic based language models using em", In Proceedings of the 6th European Conference on Speech Communication and Technology,(Eurospeech'99), Budapest, Hungary, 1999.

Marti A. Hearst, "Texttiling: Segmenting text into multi-paragraph subtopic-passages", In Computional Linguistics, 23(1):33-64, 1997.

Thomas Hoffman, "Probabalistic latent semantic indexing", In Proceedings of SIGIR-99, pp. 35-44, Berkeley, CA, 2000.

D. House, "Interactive Text Summarization for fast answers", printed from http://www.mitre.org/pubs/edge/july_97/first.htm on Nov. 25, 2002.

H. Jing, "Sentence simplification in automatic text summarization", In Proceedings of the 6th Applied Natural Language Processing Conference ((ANLP)-00), Seattle, WA, 2000.

Kevin Knight et al., "Statistics-based summarization—step one: Sentence compression", In Proceedings of the AAAI, pp. 703-710, 2000.

W. Kraaij et al. "Combining a mixture language model and naive bayes for multi-document summarisation", In Proceedings of the DUC-2001, New Orleans, LA 2001.

Bruce Krulwich et al., "Learning user information interests through the extraction of semantically significant phrases", In AAAI Spring Symposium on Machine Learning in Information Access, 1996.

Julian Kupiec et al. "A trainable document summarizer", In Proceedings of SIGIR, 1995.

Hang Li et al., "Topic Analysis using a finite mixture model", IPSJ SIGNotes Natural Language, (NL), 139(009), 2000.

C. Y. Lin et al., "The automated acquisition of topic signatures for text summarization", In Proceedings of Coling-2000, Strasbourg, France, 2000.

Andrew McCallum et al., "A comparison of event models for naive bayes text classification", In AAAI-98 Workshop of Learning for Text Categorization, Madison, WI, USA, 1998.

A. M. Steier et al., "Exporting Phrases: A statistical analysis of topical language", In 2d Symposium on Document Analysis and Information Retrieval, pp. 179-190, 1993.

Peter Turney et al., "Extraction of keyphrases from text: Evaluation of four algorithms", In Technical Report NRC-41550, National Research Council, Canada, 1997.

Peter Turney et al., "Learning algorithms for keyphrase extraction", In Information Retrieval, 2(4):303-336, 2000.

M. Witbrock et al., Headline generation: A framework for generating highly-condensed non-extractive summaries, In Proceedings of the SIGIR-99, pp. 315-316, Berkeley, CA 1999.

Ian H. Witten et al., "KEA: Practical automatic keyphrase extraction", In Proceedings of the Fourth ACM Conference on Digital Libraries, 1999.

B. Borguraev et al., "Discourse Segmentation in Aid of Document Summarization" In Proceedings of the Hawaii International Conference on System Sciences., IEEE, 2000.

T. Strzalkowski et al., "A Robust Practical Text Summarization System", In Advances in Automatic Text Summarization by Inderjeet Mani and Mark Maybury, 1999.

T. Brants et al. "Arabic Document Topic Analysis", in Proceedings of Arabic Language Resources and Evaluation: Status and Prospects, LREC-2002, Las Palmas, Spain, 2002.

Barzilay et al., "Using Lexical Chains for Text Summarization" in Advances in Automatic Text Summarization, MIT Press, Cambridge MA, 1999.

O. Buyukkokten et al., "Seeing the Whole in Parts: Text Summarization for web browsing on hand-held devices", in the 10th International WWW Conf. p. 652-662, Hong Kong, China, 2001.

P. Zellweger et al., "Fluid Links for informed and incremental link transitions" in UK Conference on Hypertext, pp. 50-57, 1998.

T. Kailith, "The Divergence and Bhattacharyya Distance Measures in Signal Selection", in IEEE Trans. on COmmunication Technology 15-1, Feb. 1967, pp. 52-60.

Y. Xie et al., "Locality in Search Engine Queries and Its Implications for Caching", IEEE Infocom 2002.

* cited by examiner

The solar system is the group of celestial bodies, including the Earth, orbiting around and gravitationally bound by the star known as the SUN, one of at least a hundred million stars in our galaxy. The Sun's retinue includes nine PLANETS, at least 54 SATELLITES, more than 1,000 observed COMETS, and thousands of lesser known bodies known as minor planets (ASTEROIDS) and meteoroids (see METEOR and METEORITE). All of these bodies are immersed in a tenous sea of fragile and rocky interplanetary dust particles, perhaps, ejected from comets at the time of their passage through the inner solar system or resulting from minor planet collisions. The Sun is the only star known through direct observation to be accompanied by such an interplanetary swarm, although it has frequently been speculated that many other stars in the galaxy may be accompanied by planetary systems, some of which may also have given rise to technological civilizations.

SYSTEMS AND METHODS FOR SENTENCE BASED INTERACTIVE TOPIC-BASED TEXT SUMMARIZATION

INCORPORATION BY REFERENCE

This Application incorporates by reference: entitled "SYSTEMS AND METHODS FOR DETERMINING THE TOPIC STRUCTURE OF A PORTION OF TEXT" by I. Tsochantaridis et al., filed Mar. 22, 2002 as U.S. patent application Ser. No. 10/103,053; entitled "SYSTEMS AND METHODS FOR DISPLAYING INTERACTIVE TOPIC BASED TEXT SUMMARIES" by F. Chen et al., filed Dec. 16, 2002, as U.S. patent application Ser. No. 10/103,053; entitled "SYSTEMS AND METHODS FOR INTERACTIVE TOPIC BASED TEXT SUMMARIZATION" by T Brants et al., filed Dec. 16, 2002, as U.S. patent application Ser. No. 10/319,508; each, in their entirety.

BACKGROUND OF THE INVENTION

1. Field of Invention

This invention relates to sentence based the interactive topic-based summarization of text information.

2. Description of Related Art

In some conventional text summarization systems, statistically significant but disjoint portions of a text are selected for display. Many conventional text summarizers operating on English language texts select initial-introductory text portions or final-conclusory text portions from a text. The text portions are then used as representatives of the complete text and displayed to users seeking an indication of the information content of the complete text. The conventional text summaries generated by these text summarization systems do not provide an indication of the topics discussed within a single text.

A few conventional systems attempt to create informative summaries that represent or possibly replace the original text. These summaries tend to be longer than an informative summary and contain more factual detail. For example, Strzalkowski et al., in "A Robust Practical Text Summarizer" in Advances in Automatic Text Summarization, MIT Press, Cambridge, Mass., 1999, incorporated herein by reference in its entirety, discusses creating "longer informative digest that can serve as surrogates for the full text" by extracting a paragraph representative of a "Discourse Macro Structure". This, conventional, known, two-part structure of "Background+What-Is-The-News" summarizes the two main parts of news articles.

Barzilay et al., developed a system that summarizes parts of documents using lexical chains to identify topics. Summaries are created by selecting a representative sentence from the strongest lexical chain. See for example, Barzilay et al., "Using Lexical Chains for Text Summarization", in Advances in Automatic Text Summarization, MIT Press, Cambridge, Mass. 1999, incorporated herein by reference in its entirety. However, the summaries generated by these conventional systems are disjointed and difficult to read.

SUMMARY OF THE INVENTION

The systems and methods according to this invention provide for determining interactive topic-based text summaries. The systems and methods according to this invention determine interactive topic-based text summaries based on sentence constituents such as words, n-grams, key-phrases and sentences. The systems and methods according to this invention also provide hierarchical interactive topic based text summarization and display.

BRIEF DESCRIPTION OF THE DRAWINGS

FIG. 8 shows a portion of a text to be summarized according to this invention;

DETAILED DESCRIPTION OF EXEMPLARY EMBODIMENTS

Figure 1:
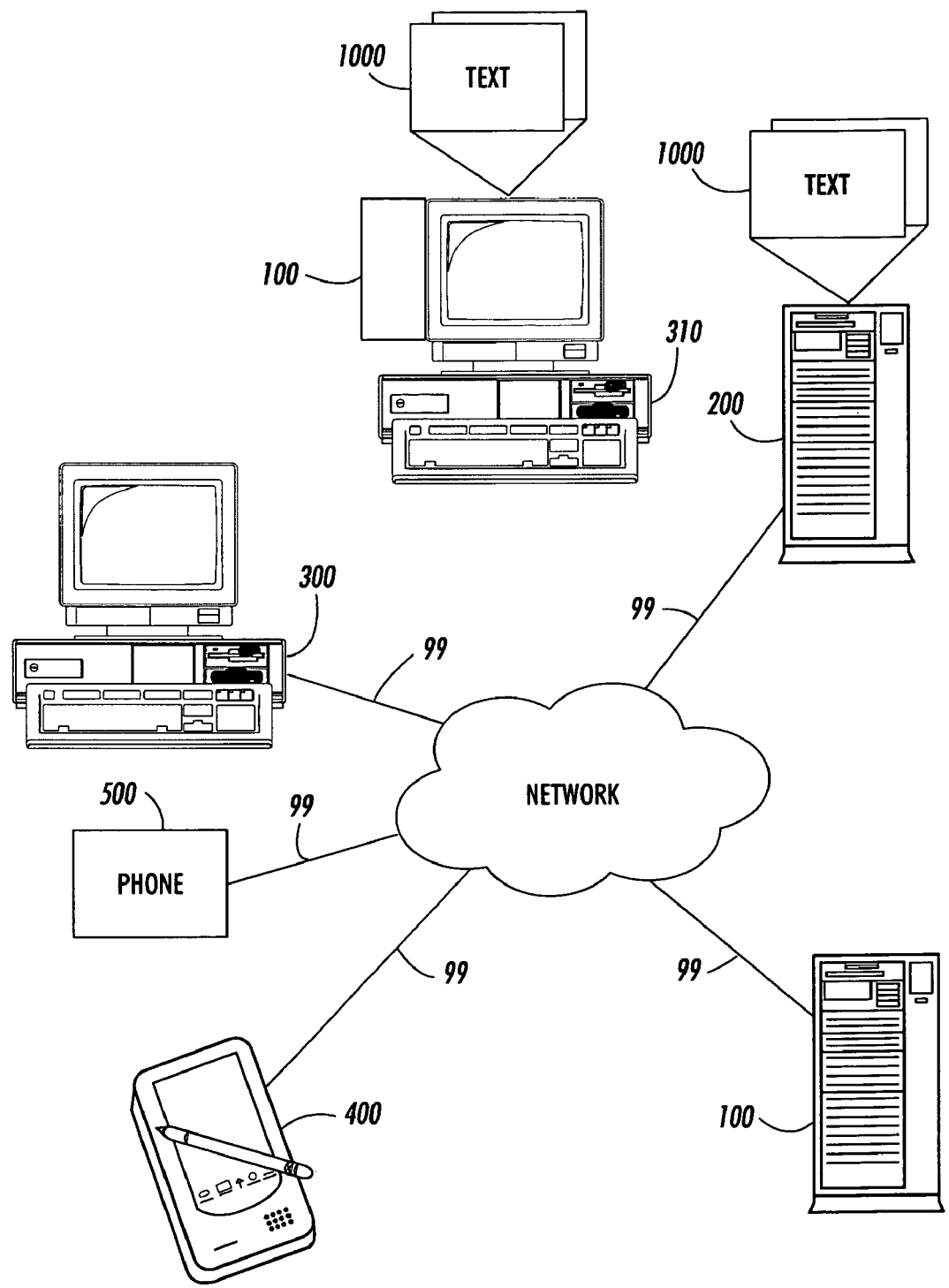
FIG. 1 is an overview of an exemplary interactive topic-based summarization system according to this invention.

FIG. 1 is an overview of an exemplary interactive topic-based text summarization system 100. The interactive topic based summarization system 100 is connected to the information repository 200 containing text information 1000, web-enabled personal computer 300, web-enabled device 400 and phone 500 via communications links 99. Personal computer 310 containing text information 1000 incorporates the interactive topic-based text summarization system 100.

In various exemplary embodiments according to this invention, the interactive topic-based text summarization system 100 receives requests originating from a user of web-enabled device 400 for an interactive topic-based summary of text information 1000 stored in information repository 200. The request for an interactive topic-based text summary of text information 1000 is received by the interactive topic-based summarization system 100 which forwards a request for text information 1000 to the information repository 200. The information repository 200 retrieves the requested text information 1000 and returns the text information 1000 to the interactive topic-based summarization system 100. An interactive topic-based text summary is determined by the interactive topic based summarization system 100 based on user interactions and previous and/or simultaneously determined user settings and forwarded to the web-enabled device 400 via communications links 99.

In various other exemplary embodiments according to this invention, the interactive topic-based text summarization system 100, and/or information repository 200 may be incorporated into a single device. For example, interactive topic-based text summarization system 100 is incorporated into personal computer 310 through the use of a software routine, software manager or the like. The interactive topic based summarization system 100 within personal computer 310 operates on text information 1000 such as html, wml, PDF, Microsoft Word® files, speech recognized audio text information and/or any file formats storing textual information accessible on a computer hard disk, floppy disk, memory disk, CD media and/or memory attached to personal computer 310.

In various other exemplary embodiments according to this invention, a user of web-enabled computer 300 requests an interactive topic-based text summary of text information 1000 contained in information repository 200. Alternatively, a user of phone 500 requests an interactive topic-based text summary of text information 1000 from information repository 200, via a voice, VML and/or VXML based browser and the like. It will be apparent that the text information 1000 may include any type of text information such as recognized text of an automatic speech recognition transcription system, optical character recognition system output and the like.

Figure 2:
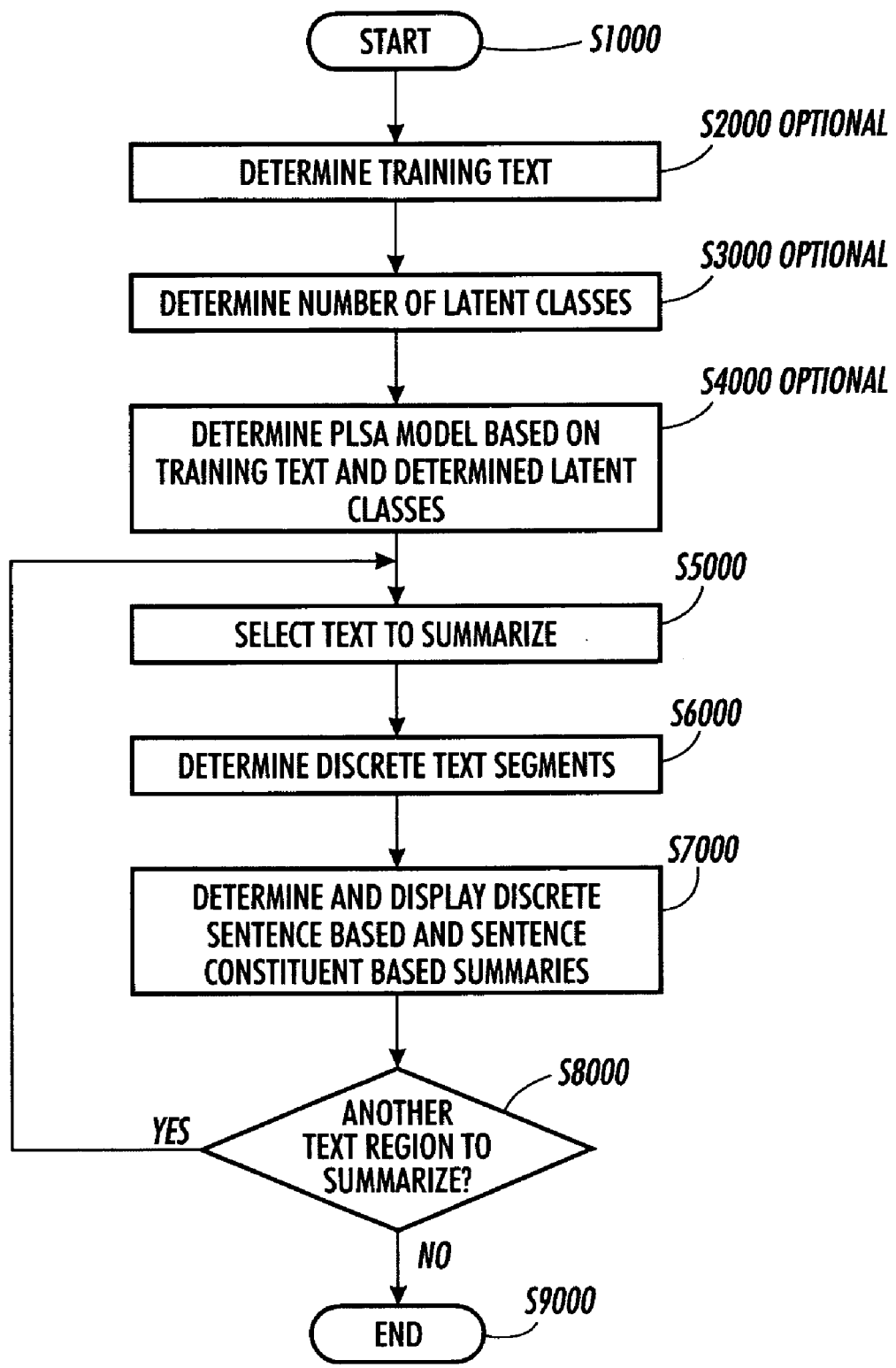
FIG. 2 is a flowchart of an exemplary method for interactive topic-based text summarization according to this invention.

FIG. 2 is a flowchart of an exemplary method for interactive topic-based text summarization according to this invention. The process begins at step S1000 and immediately continues to optional step S2000 where a training text is determined. Training texts include the Brown Corpus, the Reuters-21578 data or any other text or group of texts statistically representative of the information to be summarized. After the training text is determined, control continues to optional step S3000.

In optional step S3000, the number of latent classes in the training text is determined. The number of latent classes may be a previously determined number loaded from memory storage, determined based on the number of human assigned topics for a given text or text collection, determined based on a clustering analysis of a text or text collection or using any known or later developed method of determining latent classes in a text or text collection. After the latent classes have been determined, control continues to optional step S4000.

A probabilistic latent semantic analysis model is determined based on the training text and the determined number of latent classes in optional step S4000. The development of probabilistic latent semantic analysis models is discussed in further detail in the co-pending application entitled "SYSTEMS AND METHODS FOR DETERMINING THE TOPIC STRUCTURE OF A PORTION OF TEXT" U.S. patent application Ser. No. 10/103,053, filed Mar. 22, 2002 (hereinafter Tsochantaridis et al.) and in Hofmann T., "Probabilistic Latent Semantic Indexing", Proceedings of the SIGIR-99, pages 35-44, Berkeley, Calif. 2000, each incorporated herein by reference in their entirety. It will be apparent however, that the steps S2000-S4000 are optional. That is, any method of determining distributions such as the probabilistic latent semantic analysis model, the latent semantic analysis model or any known or later developed technique may be used in the practice of this invention. After the probabilistic latent semantic analysis model is determined, control continues to step S5000.

In step S5000, a text is selected for summarization. The text to be summarized may be selected by highlighting a portion of a text, by selecting a complete text, entering the text to be summarized manually via a keyboard, voice or handwriting recognition, selecting the text from memory storage, automatically selecting all text for summarization, selecting all text for summarization based on a device parameter such as a personal digital assistant identifier or based on any known or later developed method of selecting text.

For example, web-enabled personal digital assistants, web-enabled phones and other web-enabled portable devices have limited size screen displays. Reviewing large texts or text portions on these web-enabled portable devices is difficult and error prone due to the limited size screen display. In various exemplary embodiments of this invention, an interactive topic-based text summarization system contained within a web-enabled portable device, associated with the web-enabled portable device and/or mediating communication for the web-enabled portable device, automatically determines interactive topic-based text summaries for each received text, based on determined settings for the web-enabled portable device.

In this way, meaningful information about each discrete topic portion of the text is provided, while better utilizing the limited display capabilities of these web-enabled portable devices. In various other exemplary embodiments according to this invention, portions of the interactive topic-based text summary determined for a text may be selectively expanded to allow the discrete topics in a text to be more easily reviewed on a limited size display. After selecting the text and/or text portion to be summarized, control continues to step 6000.

In step S6000, the selected text or text portion is segmented into discrete segments. The selected text is segmented using existing markup in the text, such as HTML, paragraph indicators, section headings and the like or may be automatically segmented. For example, in various embodiments according to this invention, the text is automatically segmented using the methods and systems described in Tsochantaridis et al., U.S patent application Ser. No. 10/103,053.

In various other exemplary embodiments of this invention, segment boundaries of the text or text portions are manually indicated using highlighting, marking and inserting segment boundary indicators. However, segmentation based on paragraphs, sections headings titles and/or other text markup, manual segmentation, automatic segmentation based on probabilistic latent semantic analysis, statistical similarity or any known or later developed method of segmentation, either alone or in combination, may also be used to create discrete text segments, without departing from the scope of this invention. After the text to be summarized is segmented, control continues to step S7000.

In step S7000, the types of discrete interactive topic-based text summaries for each text segment of a text are determined. For example, interactive topic-based text summaries based on keywords, key-phrases, sentences, noun phrases, word n-grams, either alone or in combination, may be used in the practice of this invention. However, any known or later identified sentence constituent useful in conveying summary information may also be used. The determined sentence constituents such as keywords, key-phrases, sentences, noun phrases, word n-grams and the like need not be actually present in the text. Instead, in various exemplary embodiments according to this invention, the keywords, key-phrases, sentences, noun phrases, word n-grams and the like may be determined based on transformations of elements including but not limited to sentence constituents, contained in the text. For example, WORDNET lookups, transformations such as synonym selection and the like, may be used to determine keywords, key-phrases and the like based on sentence constituents present in the text. In various other exemplary embodiments according to this invention, a selected text for summarization may also be a concatenation of several distinct texts.

Exemplary discrete keyword, key-phrase and/or sentence based interactive topic-based summaries are determined as shown in the flowcharts of FIGS. 3-6. In various other embodiments according to this invention, the selection of keyword, key-phrase and/or sentence based summaries can be determined based on user preferences read from a memory, predetermined and/or automatically configured based on determined display device characteristics, adjustable by the user and/or determined using any known or later developed technique.

While the exemplary embodiment describes the sequential determination of exemplary discrete keyword, key-phrase and/or sentence based interactive topic-based text summaries, discrete keyword, key-phrase and/or sentence based interactive topic-based text summaries may be determined either sequentially or simultaneously. Moreover the discrete keyword, key-phrase, sentence and other sentence constituent based types of interactive topic-based text summaries may be displayed alone or in combination without departing from the scope of this invention.

In various other embodiments of this invention, the method of determining interactive topic based text summaries is applied recursively to a text, a text region such as a segment of a text and/or multiple segments or text regions of a text. In this way, navigation and/or understanding of the topic and sub-topic development within the text facilitated. Thus, determined discrete keyword, key-phrase and sentence based interactive topic-based text summaries may be combined to form an interactive topic-based text summary useful in providing an overview or index into topics discussed in the text. Text portions associated with topics of greater interest to a user can be more easily identified for further review. After the discrete interactive topic-based text summaries are determined and displayed, control continues to step S8000.

A determination is made whether any additional text remains to be summarized in step S8000. For example, the end of the interactive topic based text summarization session may be indicated by choosing a menu option, using a keyboard-sequence, issuing a voice command, entering a terminating gesture using a mouse or stylus or by using any known or later developed method of terminating the interactive topic based text summarization session.

If a determination is made in step S8000 that the user has not terminated the interactive topic based text summarization session, control jumps immediately to step S5000. The steps S5000-S8000 are then repeated until a determination is made that the interactive topic-based text summarization session has been terminated. During subsequent iterations of steps S5000-S8000, selection of discrete keyword, key-phrase, n-gram and sentence based interactive topic-based text summary combinations may be made to adjust the level of detail determined and displayed in step S7000. When the interactive topic-based text summarization session is terminated, control continues from step S8000 to step S9000 and the process ends.

Figure 3:
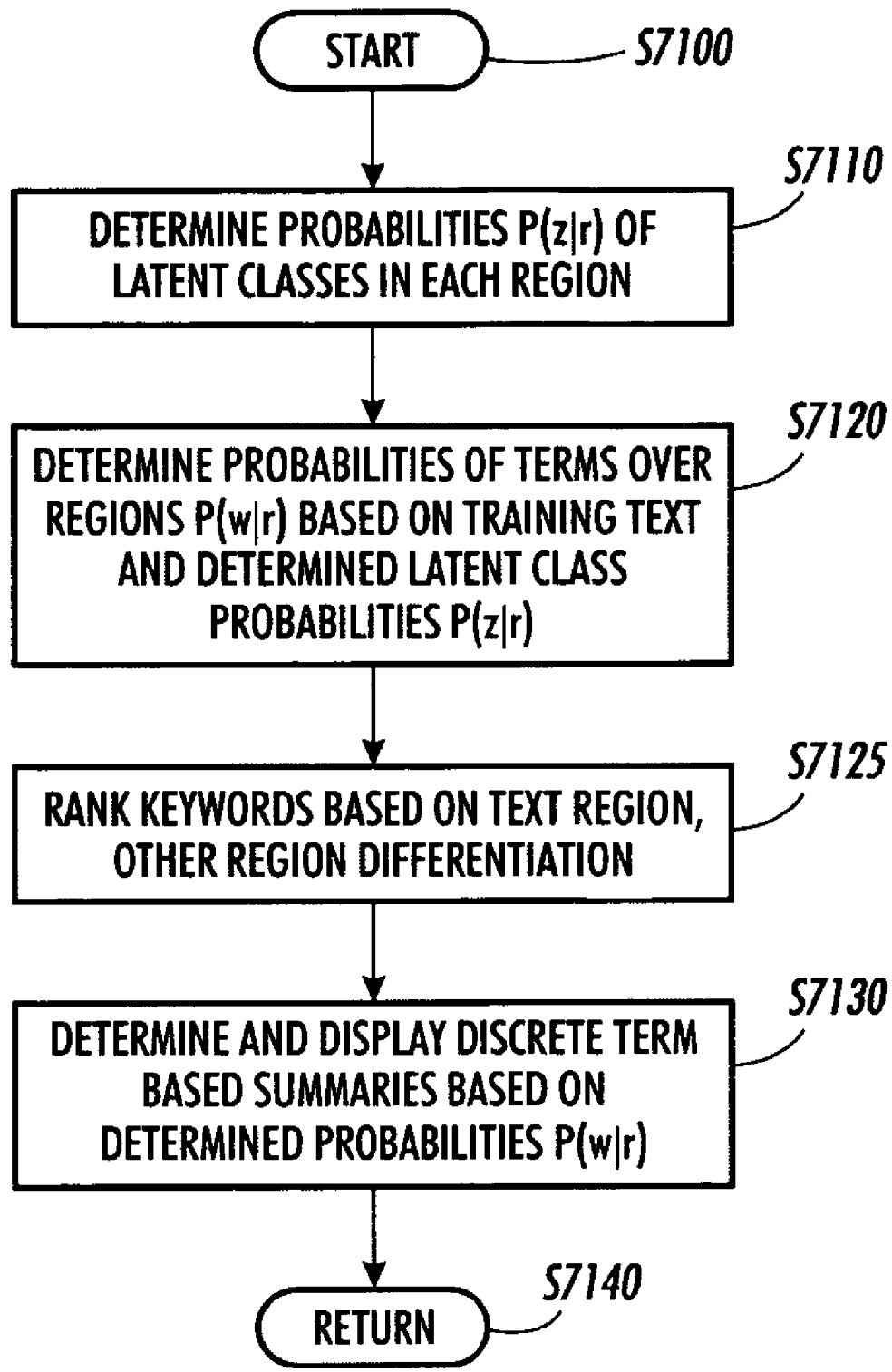
FIG. 3 is an expanded flowchart of an exemplary method of determining discrete keyword based interactive topic-based summaries according to this invention.

FIG. 3 is an expanded flowchart of an exemplary method of determining a discrete keyword based summary according to this invention. Thus, if in step S7000 of FIG. 2, the user requests a discrete keyword based interactive topic-based text summary, control continues from step S7000 of FIG. 2 to step S7100 of FIG. 3. In step S7100, control immediately continues to step S7110 where the probabilities $P(z|r)$ of latent classes z over each of the text regions r are determined. Control then continues to step S7120.

In step S7120, probabilities $P(w|r)$ of words w occurring in the text regions r may be determined. The conditional probabilities $P(w|z)$ of words w given latent classes z are determined through the analysis of a training text or set of training texts by probabilistic latent semantic analysis as discussed above. For example, in various exemplary embodiments according to this invention, the conditional probabilities $P(w|z)$ may be determined and stored in a memory as the probabilistic latent semantic analysis model is developed, determined from a lookup table or previously determined using any known later developed method. This reduces the number of additional computations required. It will be apparent that determination of $P(w|r)$ based on $P(w|z)$ and $P(z|r)$ is merely exemplary and that any known or later developed method of determining $P(w|r)$ such as determining counts in a region, performing latent semantic analysis and the like may also be used in the practice of this invention.

The probabilities $P(z|r)$ of the latent classes z over the text regions r are then determined by folding in text region r or by using any known or later developed method of determining a low dimensional representation of the text region. The probabilities of words w given the text regions may then be determined based on the formula:

$$P(w|r) = \sum_z P(w|z)P(z|r) \qquad (1)$$

After determining the probabilities $P(w|r)$, control continues to step S7125. In step S7125, keyword are ranked based on a statistical measure of text region characterization and other region differentiation. It will be apparent that any measure of text region characterization and/or other region differentiation may be used. After the keywords have been ranked, control continues to step S7130.

Keyword elements are selected for display based on the determined probabilities $P(w|r)$ in step S7130. The selected keywords are then displayed to the user. In various exemplary embodiments according to this invention, discrete keyword based interactive topic-based text summaries are displayed with a placeholder or indicator of omitted text.

For example, in various exemplary embodiments according to this invention, a human sensible display characteristic such as a '+' character may be used to indicate omitted text. The omitted text indicator may be inserted immediately preceding or immediately following omitted text. In various exemplary embodiments of this invention, the omitted text indicators are selected to dynamically display and/or expand the omitted text. Mouse roll-overs, single right mouse clicks or any known or later developed selection technique may be used to select omitted text for expanded display in a separate pop-up window, displayed as a full text expansion of the associated interactive topic-based text summary in the current window and the like. It should be noted that recursive expansions of recursively segmented text portions may also be dynamically displayed. Thus, segments of a text representative of a topic can be recursively segmented to show the subtopic development. The topic and subtopic development may be contextually displayed with an interactive topic-based text summary using placement of the subtopic elements such as indentation, bullets and the like. Omitted text for subtopics may also be displayed in pop-up windows, or using other text display mechanisms in response to mouse roll-overs, right mouse-clicks and other selection methods as discussed above. Similarly, mouse roll-offs, subsequent mouse clicks or other selection methods may be used to collapse the text associated with the interactive topic-based text summary. In various exemplary embodiments of this invention, omitted text may be indicated by font changes, sound changes, intermittent or varying presence of dynamic Braille output elements or by using any known or later developed human sensible display characteristic. Hierarchically expanded interactive topic-based text summaries may be selectively collapsed at any level.

In various other exemplary embodiments according to this invention, the context of the topic development hierarchy within a document is indicated by indenting the keyword based summaries to correspond to the location of the summarized text portion within the text as a whole. However, it will be apparent that bullets, font changes, thumbnail images, highlighting of keywords within a pop-up window or various other human sensible display characteristics useful in indicating hierarchical placement may also be used in the practice of this invention. After the selected keywords are displayed to the user, control continues to step S7140 and returns immediately to step S8000 of FIG. 2.

Figure 4:
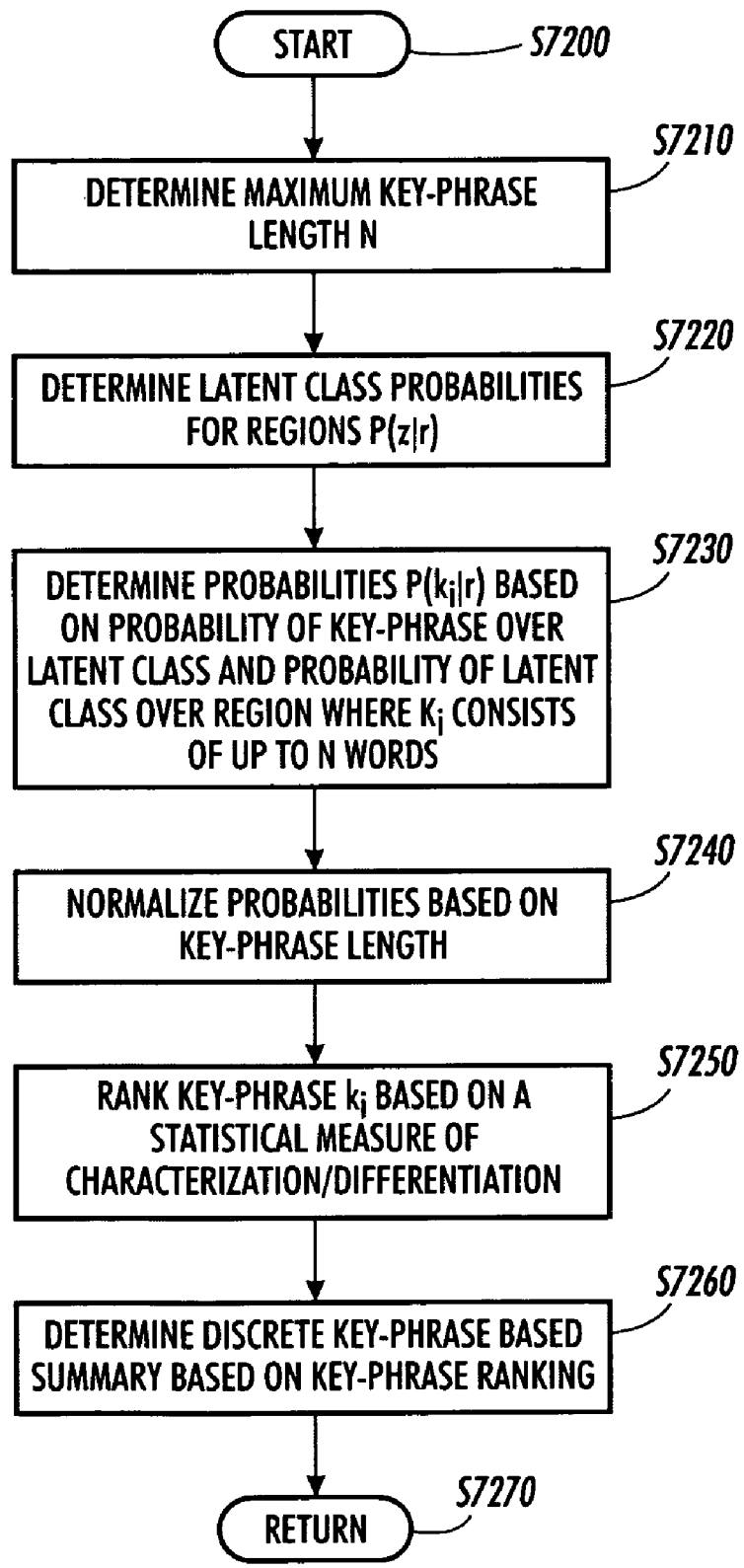
FIG. 4 is an expanded flowchart of an exemplary method of determining discrete key-phrase based interactive topic-based summaries according to this invention.

FIG. 4 is a flowchart of an exemplary method of determining discrete key-phrase based interactive topic-based text summaries according to this invention. Thus, if in step S7000 of FIG. 2, the user requests a key-phrase based interactive topic-based text summary, control continues from step S7000 of FIG. 2 to step S7200 of FIG. 4. In step S7200, control continues immediately to step S7210.

In step S7210, a maximum candidate key-phrase length is determined. The maximum candidate key-phrase length is adjustable by the user to increase or decrease the number of words permitted in the largest key-phrase. A key-phrase can be an n-gram and/or any linguistically motivated phrase, such as a noun phrase or similar. Adjustment of the candidate maximum key-phrase length allows the key-phrase to be adjusted for different user display sizes or other parameters. The maximum candidate key-phrase length may be determined based on a default number adjustable by a user, retrieved from a previously saved user-session, based on device display characteristics, cumulative and/or aggregate usage and/or determined using any known or later developed technique of maximum key-phrase determination. After the candidate key-phrase length is determined, control continues to step S7220 where the latent class probabilities P(z|r) over the regions r are determined by folding in. Control then continues to step S7230.

In step S7230, probabilities of the key-phrases over the segments or text regions r, P(k$_i$|r) are determined based on the probabilities of key-phrases over the latent classes and the probabilities of the latent class over the segment or text region r. However, it will be apparent that any method of determining the conditional probabilities P(k$_i$|r) such as determinations based on training texts, probabilistic latent semantic analysis, latent semantic analysis, lookup tables and the like may be used without departing from the scope of this invention. Each key-phrase consists of up to N words where N is the maximum candidate key-phrase length. When using probabilistic latent semantic analysis, the probabilities P(k$_i$|r) for segment or text region r are then determined based on the formula:

$$P(k_i|r) = \sum_z P(k_i|z)P(z|r) \qquad (2)$$

After determining the probabilities P(k$_i$|r), control continues to step S7240.

An adjustment of key-phrase probabilities is made in step S7240. The adjustment of key-phase probabilities compensates for the higher probabilities associated with shorter key-phrases and the lower probabilities associated with longer key-phrases. In one exemplary embodiment according to this invention, the probabilities of the key-phrases are normalized based on key-phrase length according to the formula:

$$P(k_i|r)^{1/m_i} \qquad (3)$$

where m$_i$ is the length of key-phrase k$_i$. However, any method of normalizing the probabilities of the key-phrases to compensate for key-phrase length may be used in the practice of this invention. After the probabilities of the key-phrases over the segment or text region r have been normalized, control continues to step S7250.

In step S7250, the key-phrases are ranked based on statistical measures such as mutual information, $\chi^2$ and $G^2$ distributions, log odds ratio, or any statistical measure useful in comparing distributions. In one exemplary embodiment according to this invention, the mutual information I(k$_i$;R) with the set of segments or text regions R is determined based on the following formulae:

$$I(k_i; R) = H(k_i) - H(k_i|R) \qquad (4)$$
$$= \sum_{f_i \in \{0,1\}} \sum_{r \in R} P(f_i, r) \log \frac{P(f_i, r)}{P(f_i)P(r)}$$

where the entropy H(x) is:

$$H(x) = -\sum_{x \in X} P(x) \log P(x) \qquad (5)$$

where f$_i$ is an abbreviation indicating presence of the key-phrases k$_i$. Probabilities P(f$_i$,r) are derived from counts occurrence in the data and P(f$_i$) and P(r) are respective marginals of the joint distributions.

The overall contribution of each key-phrase towards characterizing the segment or text region and differentiating the segment or text region from other segments or text regions is determined. Mutual information may be divided into four components based on presence/absence of a key-phrase in a segment or text region, and presence/absence of a key-phrase outside the segment or text region. Presence of a key-phrase in a segment or text region may be indicated by the term, (f=1) and absence indicated by the term (f=0). The segment or text region itself is indicated by the term (r) and segments or text regions outside the current segment or text region are indicated by ($\neg$r). Thus the four components or attributes of mutual information correspond to (f=1, r), (f=0,r) (f=1, $\neg$r), (f=0, $\neg$r).

In order to characterize a segment or text region, the mutual information weighting related to the presence of a key-phrase in a segment or text region (f=1,r) should be high. Similarly, the mutual information weighting related to absence of the key-phrase from other segments or text regions (f=0, $\neg$r) should also be high since higher values relate to more distinctive key-phrases.

In contrast, the mutual information weighting related to absence (f=0) in the segment or text region (r) indicates the key-phrase is less useful in text characterization. Therefore, the mutual information component (f=0,r) should have a low value. The mutual information component related to presence (f=1) in other segments or text regions (¬r) indicates the key-phrase is less distinctive with respect to other segments or text regions of the text. Therefore the mutual information component (f=1, ¬r) should have a low value.

In various exemplary embodiments of this invention, mutual information and components of mutual information are used to determine a segment text region characterization and other segment or text region differentiation. However, it will be apparent that any known or later developed method of segment or text region characterization and/or other segment or text region differentiation may be used in the practice of this invention. For example, in one of the exemplary embodiments according to this invention, a ranking or score for the presence of a key-phrase in the segment or text region is determined from components of mutual information $CI(k_i;r)$ according to the formula:

$$CI(k_i; r) = P(k_i, r) \log \frac{P(k_i, r)}{P(k_i)P(r)} \quad (6)$$

After the combination of mutual information components or statistical measures have been determined, control continues to step S7260.

In step S7260, discrete key-phrases are selected based on the ranking or score of the mutual information and/or statistical measures. In various exemplary embodiments of this invention, the top L ranked discrete key-phrases for each segment or text region are selected. However, other discrete key-phrase selection methods may also be used without departing from the scope of this invention.

In various other exemplary embodiments of this invention, the first top ranked phrase is selected. The key-phrase is added to a discrete multi-key-phrase based interactive topic-based text summary. The elements of the selected key-phrase are removed from the segment or text region r to create $r_{new}$, a new set of latent classes is determined. New probabilities $P(k_i|r_{new})$, new mutual information and/or statistical measure scores and new key-phrase rankings are determined and a new set of the highest ranking key-phrases is determined and selected. The process continues until the required number of key-phrases is selected for the discrete interactive topic-based multi-key-phrase text summary of the segment or text region.

The current key-phrase based interactive topic-based summary is then displayed to the user. The key-phrase based interactive topic-based text summary indicates omitted text using omitted text indicators such as special characters preceding or following the omitted text, fonts, color or any known or later developed human sensible display characteristic useful in indicating omitted text and control continues to step S7270. The flow of control then returns from step S7270 of FIG. 4 to step S8000 of FIG. 2 where processing continues as described above for FIG. 2.

Figure 5:
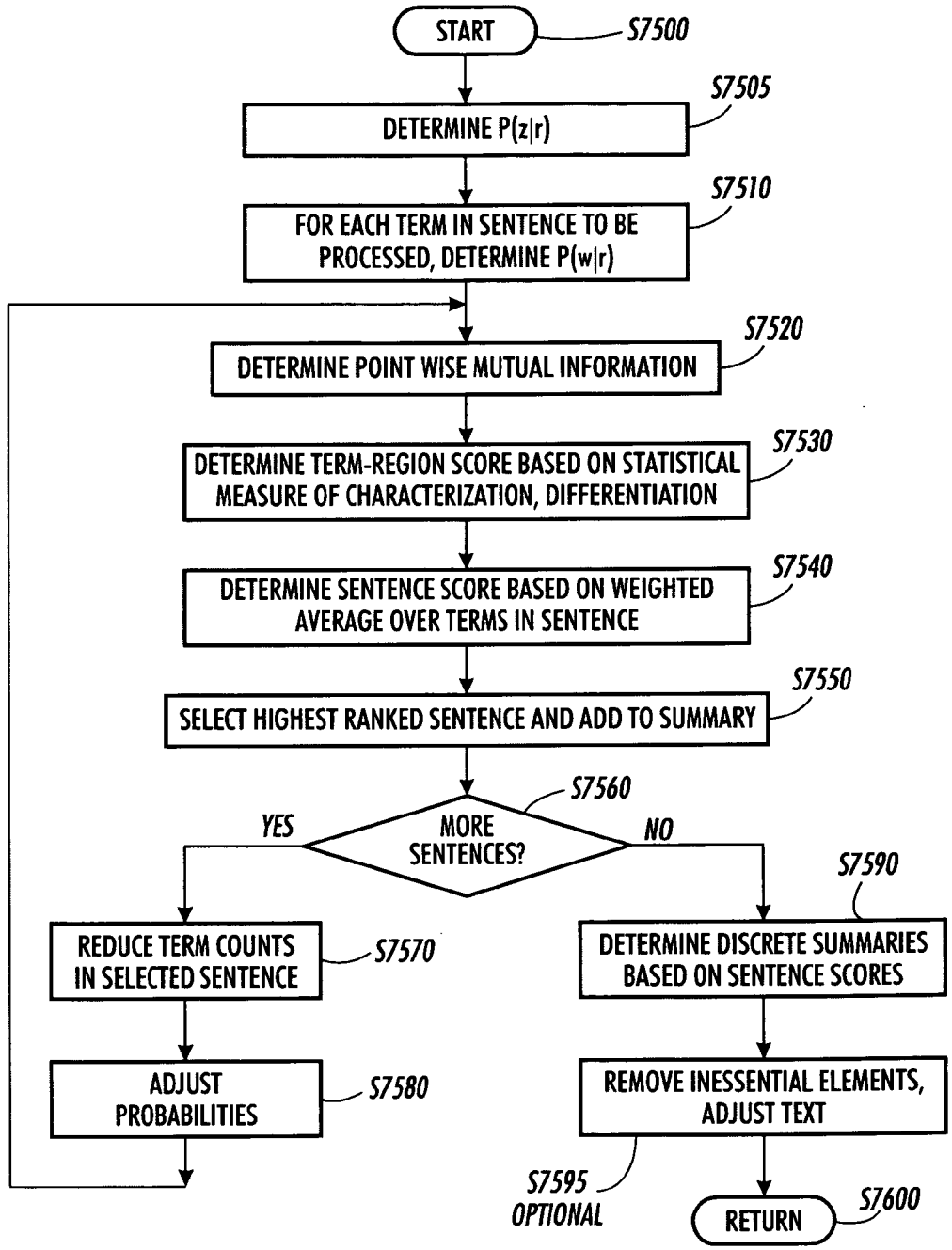
FIG. 5 is an expanded flowchart of a first exemplary method of determining discrete sentence based interactive topic-based summaries according to this invention.

FIG. 5 is a first exemplary sentence level method of determining discrete sentence based interactive topic-based text summaries according to this invention. Thus, if in step S7000 of FIG. 2, the user requests a discrete sentence based interactive topic-based text summary, control continues from step S7000 of FIG. 2 to step S7500 of FIG. 5. In step S7500, control continues immediately to step S7510 where the conditional probability of the latent classes given the segment or text region r are determined using folding in. Control then continues to step S7510. In step S7510, the probability of the terms $w_i$ in the segment or text region r are determined based on the conditional probabilities of the terms $w_i$ given the latent classes $P(w_i|z)$ and the probabilities of the latent classes over the segment or text region r using probabilistic latent semantic analysis. In various exemplary embodiments of this invention, conditional probabilities such as $P(w_i|z)$ determined and stored during earlier development of the probabilistic latent semantic analysis model, may be retrieved for use, reducing the computations required. Control then continues to step S7520.

The pointwise mutual information $I(f_i,r)$ between $f_i$, a function indicating the presence of term $w_i$, and the segment or text region (r) is determined in step S7520. In various exemplary embodiments according to this invention, pointwise mutual information may be determined according to the formula:

$$I(f_i, r) = \log \frac{P(f_i|r)}{P(f_i)} = \log \frac{P(f_i, r)}{P(f_i)P(r)} \quad (7)$$

where $P(f_i)$ $P(r)$ and $P(f_i,r)$ are computed by summing over the sentences, $P(f_i,r)$ is the number of sentences in a topic segment or region r containing term $w_i$. However, it will be apparent that any known or later developed statistical measure may be used in the practice of this invention. After determining the pointwise mutual information, control continues to step S7530.

In step S7530, a term-region score is determined based on presence of a term ($f_i$=1) in a segment or text region (r), and absence ($f_i$=0) of the term from other segments or text regions (¬r) based on the following formula:

$$\text{Score}_{w_i,\neg r} = \lambda P(f_i=1|r)I(f_i=1,r) + (1-\lambda)P(f_i=0|\neg r)I(f_i=0, \neg r) \quad (8)$$

The parameter X defaults to a value of 0.5 but may be adjusted to weight the relative importance of a word's presence or absence in a segment or text region.

In various other exemplary embodiments, the log odds ratio defined by the formula:

$$\text{Score}(w_i) = \log \frac{P(f_i = 1|r)/P(f_i = 0|r)}{P(f_i = 1|\neg r)/P(f_i = 0|\neg r)} \quad (9)$$

is used as an alternate measure indicating term similarity to text in a segment or text region and dissimilarity from text in other segments or text regions. However, mutual information, $\chi^2$ and $G^2$ distributions, log odds ratio, or any known or later developed measure useful in comparing distributions term similarity to a segment or text region and/or dissimilarity to other segments or text regions may be used in the practice of this invention. After the term-region score is determined, control continues to step S7540.

In step S7540, sentence scores are determined based on the weighted average over terms. It will be apparent that a subset of terms may be considered such that words appearing on a stoplist and the like are ignored. For example, in various exemplary embodiments according to this invention, $P(w_i)$ is a relative frequency of $w_i$ in the sentence which may ignore words on a stoplist. The sentence score is then determined based on the formula:

$$\text{Score}(S) = \sum_{w_i \in S} P(w_i)\text{Score}(w_i) \qquad (10)$$

where $w_i$ correspond to the terms in sentence S. The scores for each sentence are compared. High scores are used as a basis for selection as a sentence level interactive topic-based summary for the segment or text region.

In various other exemplary embodiments according to this invention, additional characteristics such as location of the candidate sentence in the region may be used to further adjust the scores used to rank the sentences for selection. For example, it may be determined that for certain texts, more important information tends to be placed in the beginning or at the end of a text. Therefore, further adjustment of the sentence scores may also be performed based on attributes of the text such as sentence location, sentence placement, indicator phrases, cue phrases or any known or later developed determined textual characteristic useful in identifying essential information. After the sentence scores are determined, control continues to step S7550.

In step S7550, the sentence with the highest sentence rank or score is selected and added to the interactive topic-based text summary. In various exemplary embodiments according to this invention, the selected sentence may be compressed by removing inessential elements before addition to the interactive topic-based text summary. Inessential elements to be removed from a selected sentence may be determined using syntactic analysis, semantic analysis, statistical filtering and or any other known or later developed method of determining inessential elements in a sentence. Control continues to step S7560 where it is determined if additional sentences are required for the sentence based interactive topic-based text summary. If additional sentences are required, control continues to step S7570.

In step S7570, term counts associated with the selected sentence are reduced. This prevents repetition or reduces the likelihood of the same terms in multi-sentence based interactive topic-based text summaries. Control then continues to step S7580 where the probabilities are adjusted to compensate for the reduced term counts. For example, the term counts can be reduced to zero to eliminate further consideration of a term. Control then jumps to step S7520. Steps S7520-S7560 are repeated until it is determined in step S7560 that no additional sentences are required for the discrete sentence based interactive topic-based text summary. Control then continues to step S7590.

A discrete sentence based interactive topic-based text summary is displayed in step S7590. As discussed above, the sentence based interactive topic-based text summary may use human sensible display characteristics to indicate omitted text in the discrete interactive topic-based text summary. Control then continues to optional step S7595. In optional step S7595, inessential elements of the selected sentence are removed. For example, inessential elements of the selected sentence may be removed based on syntactic analysis, semantic analysis, statistical filtering and any known or later developed method useful in removing inessential sentence elements. In a further optional operation, the text may be adjusted to improve readability. For example, filling words may be added, anaphoric references resolved or any known or later developed method of improving text readability. Control then continues to step S7600. The flow of control then returns from step S7600 of FIG. 5 to step S8000 of FIG. 2 where processing continues as described above for FIG. 2.

Figure 6:
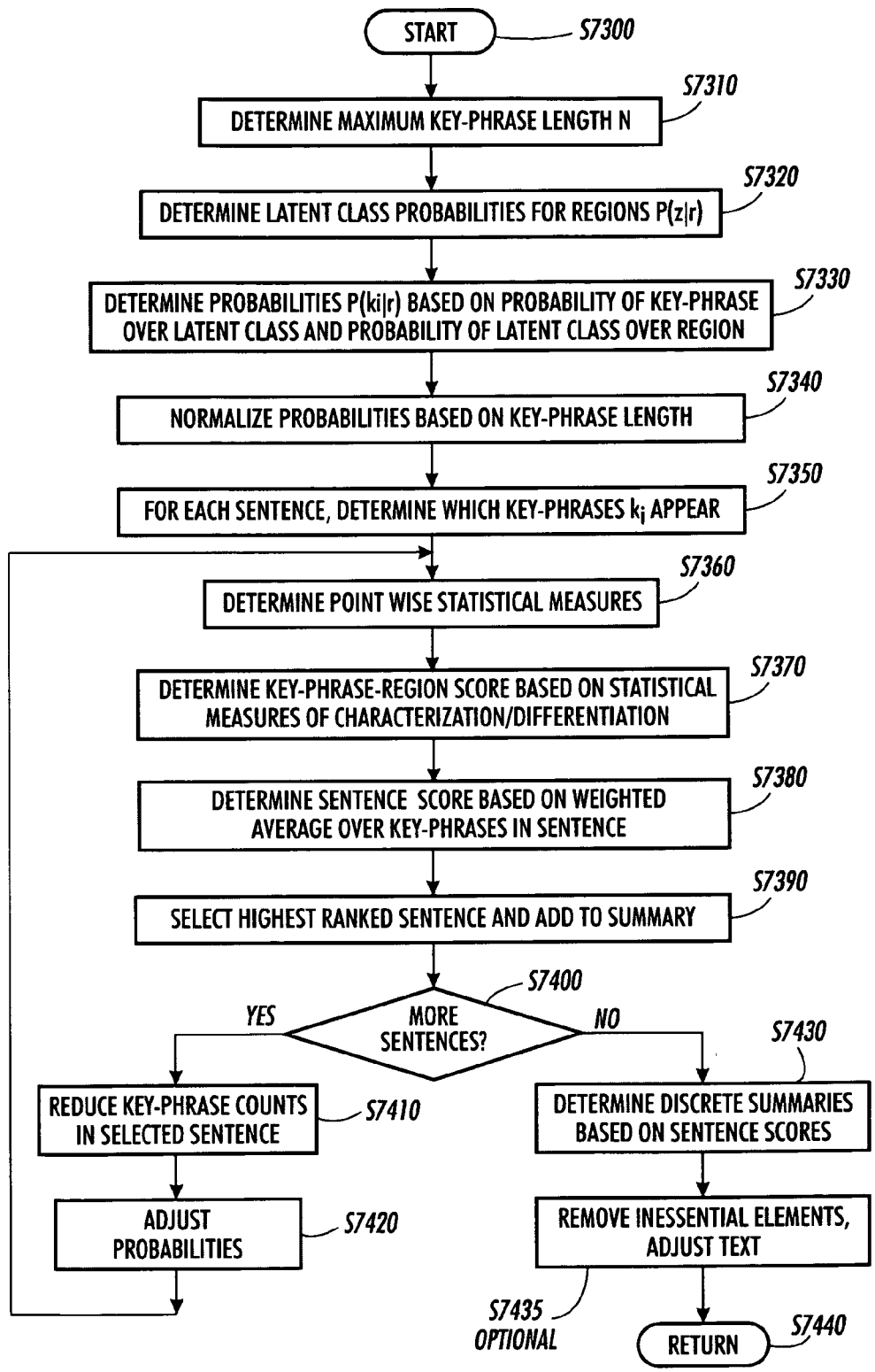
FIG. 6 is an expanded flowchart of a second exemplary method of determining discrete sentence based interactive topic-based summaries according to this invention.

FIG. 6 is a flowchart of a second exemplary method of determining discrete sentence based interactive topic based text summaries according to this invention. Thus, if in step S7000 of FIG. 2, a user requests a sentence based interactive topic-based text summary, control continues from step S7000 of FIG. 2 to step S7300 of FIG. 6. In step S7300, control continues immediately to step S7310.

In step S7310, the maximum candidate key-phrase length is determined. As discussed above, the candidate maximum key-phrase length is adjustable by the user to increase or decrease the number of words permitted in the largest key-phrase. The maximum candidate key-phrase length may be determined based on a default number adjustable by a user, retrieved from a previously saved user-session, based on device display characteristics, based on cumulative and/or aggregate usage or determined using any known or later developed technique of determining the candidate maximum key-phrase length determination. After the determination of the candidate maximum key-phrase length, control continues to step S7320 where the latent class probabilities $P(z|r)$ over the regions r are determined by folding in. Control then continues to step S7330.

The probabilities $P(k_i|r)$ of the key-phrases in the segment or text regions (r) are determined based on the conditional probabilities of key-phrases given the latent classes $P(k_i|z)$ and the probabilities of the latent class over the segment or text region (r) through probabilistic latent semantic analysis. In various exemplary embodiments according to this invention, the conditional probabilities such as $P(k_i|z)$, may also be determined through training texts, probabilistic latent semantic analysis, model development and/or retrieved from a lookup table. Moreover, it will be apparent that the determination of $P(k_i|r)$ based on $P(k_i|z)$ and $P(z|r)$ is merely exemplary and that any known or later developed method such as latent semantic analysis of the text and the like may be used. Each key-phrase consists of up to N key-phrase words where N is the previously determined maximum key-phrase length. The probabilities $P(k_i|r)$ for segment or text region r are then determined based on the formula:

$$P(k_i|r) = \sum_z P(k_i|z)P(z|r) \qquad (11)$$

After determining the probabilities $P(k_i|r)$, control continues to step S7340.

In step S7340, an adjustment is made to compensate for the lower probabilities associated with the longer key-phrases by normalizing the probabilities based on key-phrase length. In one of the various exemplary embodiments, the key-phrases are normalized based on the formula:

$$P(k_i|r)^{1/m_i} \qquad (12)$$

where $m_i$ is the length of key-phrase $k_i$. After the probabilities of the key-phrases over segment or text region r have been normalized, control continues to step S7350 where each sentence is analyzed to determine whether key-phrases $k_i$ appear. Control then continues to step S7360.

The pointwise mutual information $I(f_i,r)$ between $f_i$, a function indicating the presence of key-phrases $k_i$, and the segment or text region (r) is determined in step S7360. The pointwise mutual information is determined using the formula:

$$I(f_i, r) = \log\frac{P(f_i|r)}{P(f_i)} = \log\frac{P(f_i, r)}{P(f_i)P(r)} \quad (13)$$

where $P(f_i)$ $P(r)$ and $P(f_i,r)$ are computed by summing over the sentences, $P(f_i,r)$ is the joint probability of key-phrase $f_i$ given r, the number of sentences in topic segment or text region r containing key-phrase $k_i$ divided by the number of sentences in the document. However, it will be apparent that any known or later developed statistical measure useful in determining text characterization and/or distinctiveness may be used in the practice of this invention. After determining the text characterization and text distinctiveness of the key-phrases, control continues to step S7370.

In step S7370, a key-phrase-region score is determined based on presence of a key-phrase ($f_i$=1) in a segment or text region (r), and absence ($f_i$=0) of the key-phrase from other segments or text regions ($\neg r$) based on the following formula:

$$\text{Score}_{k_i} = \lambda P(f_i=1|r)I(f_i=1,r)+(1-\lambda)P(f_i=0|\neg r)I(f_i=0,\neg r) \quad (14)$$

The parameter $\lambda$ defaults to a value of 0.5 but may be adjusted to weight the relative importance of a key-phrase's presence or absence in a segment or text region.

In various other exemplary embodiments, the log odds ratio defined by the formula:

$$\text{Score}(k_i) = \log\frac{P(f_i=1|r)/P(f_i=0|r)}{P(f_i=1|\neg r)/P(f_i=0|\neg r)} \quad (15)$$

may be used as an alternate measure indicating key-phrase similarity to text in a segment or text region and dissimilarity from other segments or text regions. However, any known or later developed method of determining key-phrase similarity to a segment or text region and dissimilarity to other segments or text regions may be used in the practice of this invention. After the key-phrase-region score is determined, control continues to step S7380.

In step S7380, sentence scores are determined based on the weighted average over key-phrases in the sentence based on the formula:

$$\text{Score}(S) = \sum_{k_i \in S} P(k_i)\text{Score}(k_i) \quad (16)$$

where $k_i$ corresponds to the key-phrases in sentence S and $P(k_i)$ is the probability of seeing key-phrase $k_i$. For example, $P(k_i)$ is the relative frequency of $k_i$ in the sentence. The scores for each sentence are compared. High scores are used as a basis for selection as a sentence based interactive topic-based summary for the segment or text region.

In various other exemplary embodiments according to this invention, additional characteristics such as location of the candidate sentence in the region may be used to further adjust the scores used to rank the sentences for selection. For example, it may be determined that for certain texts, more important information tends to be placed in the beginning or at the end of a text. Therefore, further adjustment of the sentence scores may also be performed based on attributes of the text such as sentence location, sentence placement, indicator phrases, cue phrases or any known or later developed determined textual characteristic useful in identifying essential information. After the sentence scores are determined, control continues to step S7390.

In step S7390, the sentence with the highest sentence rank or score is selected and added to the interactive topic-based summary. Control continues to step S7400 where a determination is made whether additional sentences are required for the discrete sentence based interactive topic-based text summary. If additional sentences are required, control continues to step S7410.

In step S7410, the key-phrase counts associated with the selected sentence are reduced. This prevents or reduces the likelihood of repetition of the same key-phrases in multi-sentence interactive topic-based text summaries. Control then continues to step S7420 where the probabilities are adjusted to compensate for the reduced key-phrase counts. Control then jumps to step S7360. Steps S7360-S7400 are repeated until it is determined in step S7400 that no additional sentences are required for the discrete multi-sentence based interactive topic-based text summary. Control then continues to step S7430.

The discrete sentence based interactive topic-based text summary is displayed in step S7430. As discussed above, the sentence based interactive topic-based text summary may use human sensible display characteristics to indicate omitted text in the summary. Control then continues to optional step S7435. In optional step S7435, inessential elements of the selected sentence are removed. For example, inessential elements of the selected sentence may be removed based on syntactic analysis, semantic analysis, statistical filtering and any known or later developed method useful in removing inessential sentence elements. In a further optional operation, the text may also be adjusted to improve readability. For example, filling words may be added, anaphoric references resolved or any known or later developed method of improving text readability. Control then continues to step S7440. The flow of control then returns from step S7440 of FIG. 6 to step S8000 of FIG. 2 where processing continues as described above for FIG. 2.

The various exemplary flowcharts show the determinations necessary for selecting summaries of a single topical segment or text region with respect to either all other topical segments or text regions or adjacent topical segments or text regions. However, in various other exemplary embodiments of this invention, each of the topical segments or text regions may be considered separately. For example, composite scores for term occurrences in each of the other topical regions ($r_j$ in $\neg R$) is averaged to determine a composite based on the formula:

$$\text{Score}(f_i, \neg R) = \sum_{r_j \varepsilon \neg R} P(f_i, r_j)\log\frac{P(f_i|r_j)}{P(f_i)} \quad (17)$$

Term and/or sentence scores are determined as discussed above.

It will be apparent that multiple sentence constituent based interactive topic based text summaries may be displayed, singly or in combinations to form a hierarchical interactive topic-based text summaries based on multiple and differing types of sentence constituents.

Figure 7:
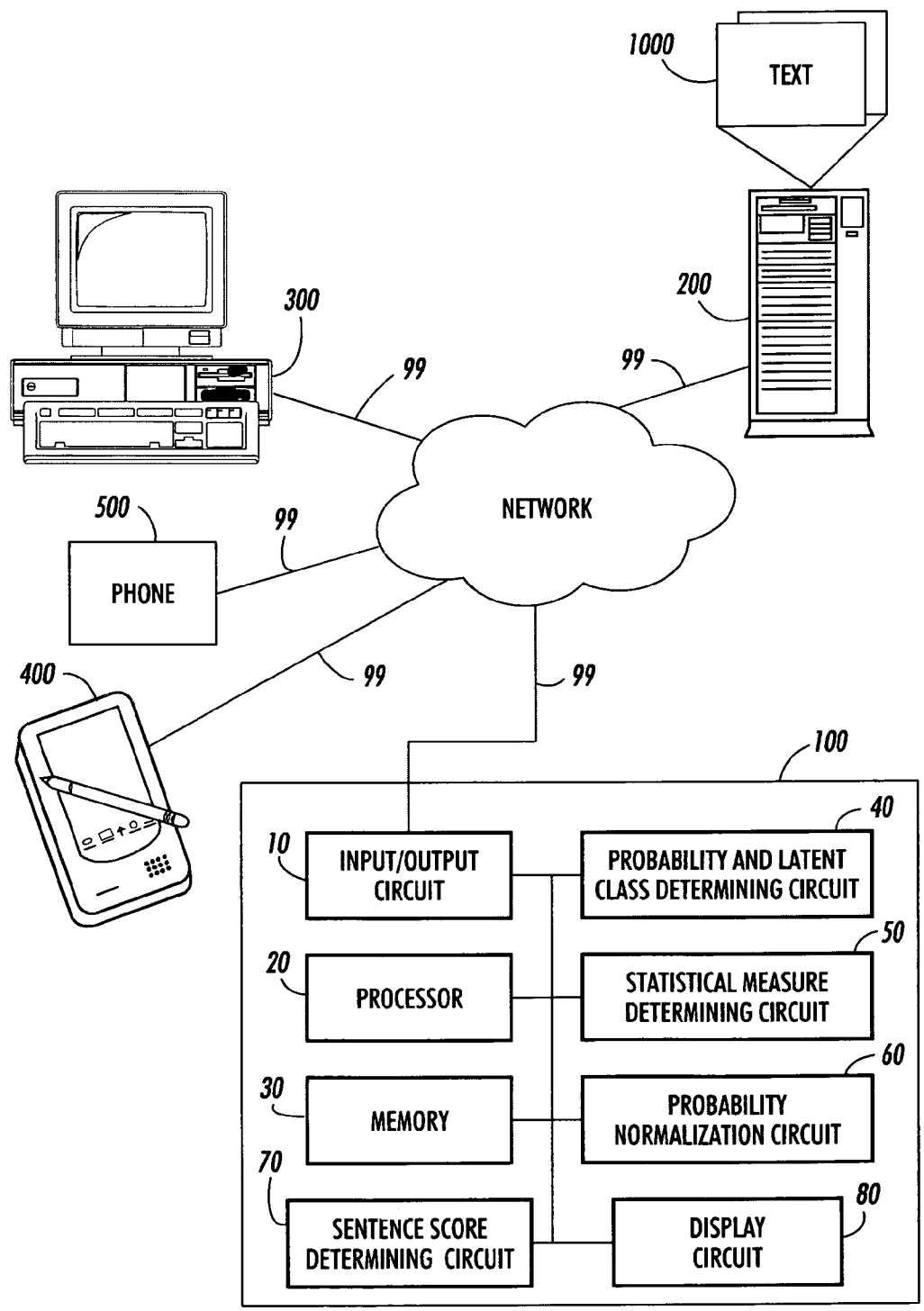
FIG. 7 shows an exemplary interactive topic-based text summarization system according to this invention.

FIG. 7 shows an exemplary interactive topic-based text summarization system according to this invention. The interactive topic based summarization system 100 comprising processor 20, memory 30, probability and latent class determining circuit 40, statistical measure determining circuit 50, probability normalization circuit 60, sentence score determining circuit 70 and display determining circuit 80, each connected to communications links 99 via input/output circuit 10. The interactive topic based summarization system 100 is connected to the information repository 200, web-enabled personal computer 300, web-enabled portable device 400 and phone 500 via communications links 99.

The interactive topic-based summarization system 100 receives a request for an interactive topic-based summary of text 1000 from the user of web-enabled portable device 400 and/or web-enabled personal computer 300 over communications links 99. The interactive topic-based text summarization system 100 forwards a request for the text 1000 to information repository 200. The information repository 200 forwards text 1000 via communications links 99 to the input/output circuit 10 of interactive topic-based summarization system 100.

Processor 20 of the interactive topic-based summarization system 100 retrieves previously stored and/or selected user preferences or default parameters specifying sentence constituent summary type, maximum candidate key-phrase length, default human sensible display characteristic and the like. Based on the stored and/or selected preferences, a sentence constituent summary type is determined. For example, sentence constituent summary types may be keyword, key-phrase, n-gram and sentence based. However, it will be apparent that any type of sentence constituent useful in determining discrete topics may be used in the practice of this invention.

Processor 20 activates the probability and latent class determining circuit 40 to determine the probabilities of the key-phrases $P(k_i|r)$ in the segments or text regions r. For example, $P(k_i|r)$ may be determined based on the conditional probabilities of key-phrases given the latent classes $P(k_i|z)$ and the probabilities of the latent class over the segment or text region r through probabilistic latent semantic analysis or similar techniques. It will be apparent that the conditional probabilities of key-phrases $P(k_i|z)$ may be determined and/or stored in memory as the probabilistic latent semantic analysis model is developed in prior steps thereby reducing required computations. Moreover, as discussed above, it will be apparent that the determination of $P(k_i|r)$ based on $P(k_i|z)$ and $P(z|r)$ is merely exemplary and any method of determining $P(k_i|r)$ may be used in the practice of this invention.

The processor 20 activates the probability normalization circuit 60 to compensate for the higher probability of shorter key-phrases and lower probability of longer key-phrases by normalizing the probabilities of the key-phrases based on key-phrase length.

The processor 20 activates the statistical measure determining circuit 50 to determine the distributions of the key-phrases. For example, in various exemplary embodiments according to this invention, mutual information, $\chi^2$, $G^2$ distributions are used to determine key-phrase distributions. However, it will be apparent that any statistical measure useful in determining measures by which key-phrases characterize a segment or text region and/or differentiate a segment or text region from other regions may be used in the practice of this invention.

The processor 20 activates the sentence score determining circuit 70 if it is determined that sentence summaries were selected. The sentence score determining circuit 70 determines weighted averages for key-phrases over the sentence. Processor 20 selects the highest ranking/scoring sentence for segments or text regions of a text and adds the sentence to the sentence based interactive topic-based text summary. If multi-sentence interactive topic-based text summaries are selected, the key-phrase counts associated with the added sentence are reduced to eliminate repeating sentences, the statistical measures and sentence scores are re-determined and new highest ranking/scoring sentences are determined until the required number of sentences has been selected.

After discrete interactive topic-based text summaries have been determined, display circuit 80 is activated to display the text. In various exemplary embodiments according to this invention, discrete keyword and discrete sentence based interactive topic-based summaries are simultaneously displayed adjacent to a text providing an indication of topic development in the text. In various other exemplary embodiments according to this invention, text indents in the interactive topic-based text summary, spacing, placement, text color, bullets, thumbnail text images, or any human sensible display characteristics may be used to simultaneously indicate the placement and/or development of the summarized topic within the text.

FIG. 8 shows a portion of a text to be summarized according to this invention. The text 1000 contains four sentences over sixteen lines of the display. The text is densely written and the topic and subtopic development difficult to determine.

Figure 9:
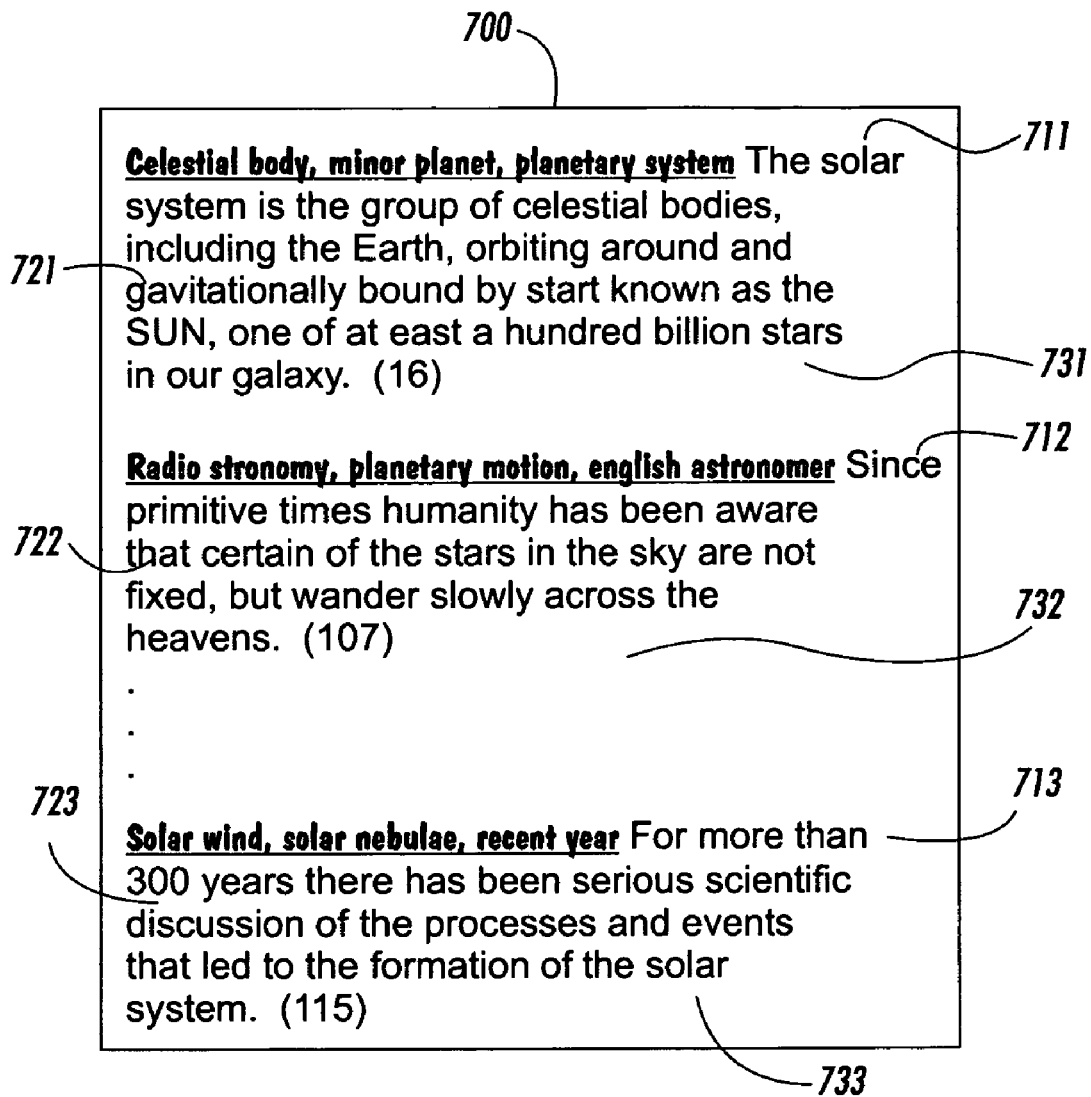
FIG. 9 shows an exemplary interactive topic-based text summary according to this invention.

FIG. 9 shows an exemplary interactive topic-based text summary according to this invention. The interactive topic-based text summary 700 of text 1000 is based on both sentence based summaries 721-723 and key-phrase based summaries 711-713. The number of summarized lines of text is indicated by line numbers 731-733. Omitted text is indicated by the underlining of key-phrase based summary 711 as omitted text indicators. However, it will be apparent that any known or later developed human sensible display characteristic may be used as an omitted text indicator according to this invention. The underlining omitted text indicator indicates additional relevant text is available for review. For example, in one exemplary embodiment according to this invention, single clicking on the human sensible omitted text indicator interactively expands to display the text segment and/or full text associated the keyword based interactive topic-based text summary.

Similarly italics and bolding are human sensible display characteristics associated with omitted text indicators for key-phrase based summaries 712-713. The keyword and sentence based summaries are co-located and placed to provide contextual organizing and location information indicating the approximate location of the topic within text 1000.

Figure 10:
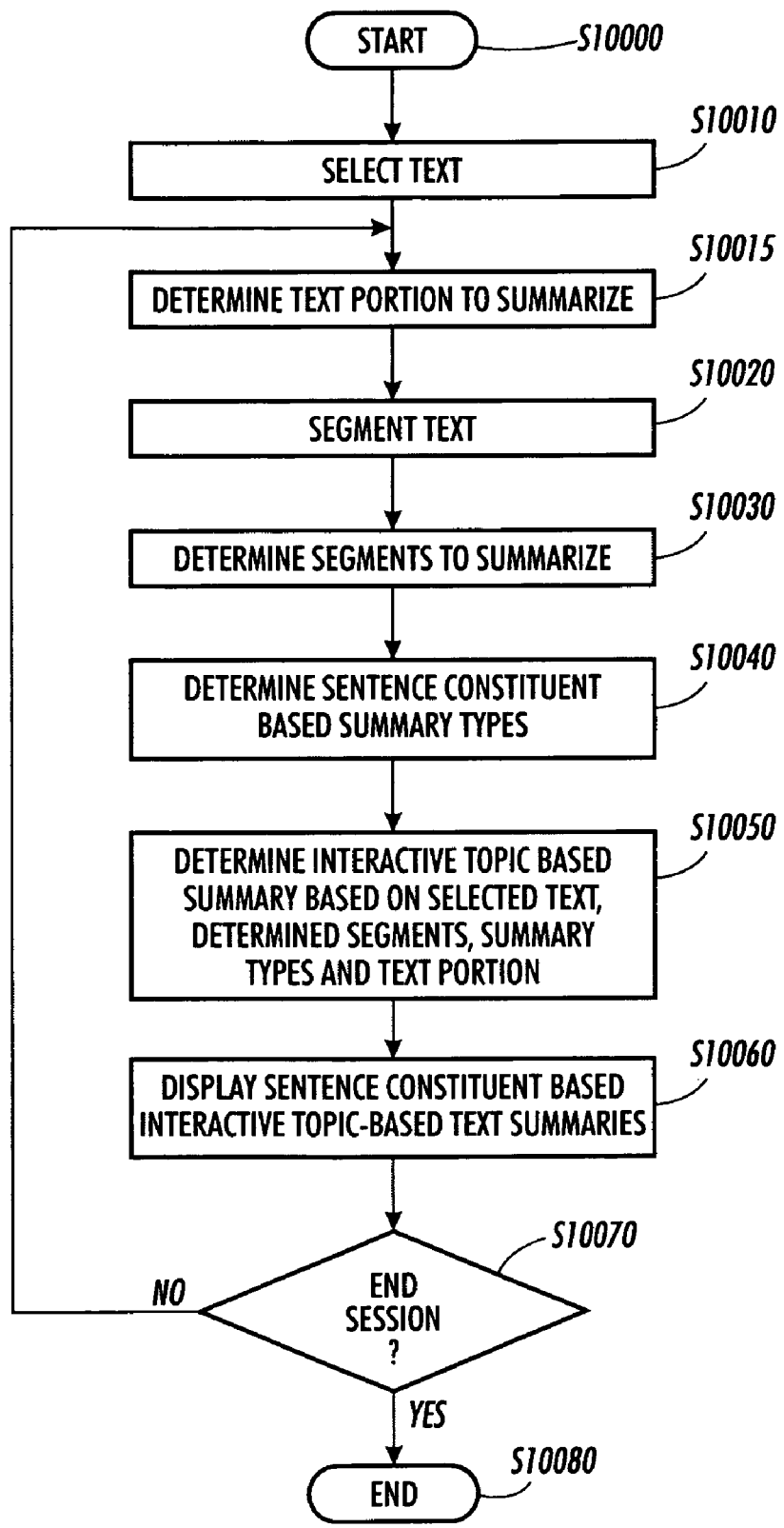
FIG. 10 shows a flowchart of an exemplary method for interactive topic-based text summary display according to this invention.

FIG. 10 is an exemplary flowchart of an interactive topic-based text summary display according to this invention. The process begins at step S10000 and immediately continues to step S10010.

In step S10010, a text to be summarized is selected. The text is selected using dialog box to enter a filename, selecting a filename using a mouse or a computer recognizable gesture, voice command or using any known or later developed method of selecting a text. After the text is selected, control continues to step S10015 where a portion of the text is dynamically selected for summarization. The text may be selected using known or later developed selection method such as highlighting, bounding boxes, and the like. Control then continues step S1020.

In step S1020, the selected text is then segmented. As discussed above, the text is segmented using existing segment indicators, automatically segmented and/or segmented using any known or later developed segmentation technique.

It should be noted that segments can be created manually by highlighting the text, bounding the text with a segment bounding box and the like. After the selected text is segmented, control continues to step S10030.

In step S10030, segments to be summarized are determined. For example, in the exemplary embodiment, the segments are determined automatically. However, in various other exemplary embodiments according to this invention, a user may determine segments. A user may indicate a segment within the selected portion of text to be summarized using a bounding box, highlighting the text using a mouse or pointing device or any other technique. It should be noted that segments can be created manually by highlighting the text, bounding the text with a segment bounding box and the like. In various exemplary embodiments according to this invention, segments manually created with a bounding box are impliedly selected as the segment to be summarized. However, any of these default conditions are alterable without departing from the scope of this invention. In various embodiments of this invention, segments of text may be recursively selected for summarization further segmenting determined segments into smaller units. Sub-segments or portions of segments may be contextually displayed using indentation and the like to indicate associated hierarchical levels. After selecting the segment to summarize, control continues to step S10040.

The sentence constituent based summary type is determined in step S10040. For example, an entire sentence, a key-phrase, keywords and or any other sentence constituent may be selected as the basis for determining an interactive topic-based text summary. It will also be apparent that different types of sentence constituent based interactive topic-based text summaries may be combined either singly or in combinations to form hierarchical sentence constituent based interactive topic-based text summaries. After determining the sentence constituent based summary type, control continues to step S10050.

In step S10050, a sentence constituent based interactive topic-based text summary is determined base on the selected text, the determined segment, the determined portion of text and the determined sentence constituent based summary type. For example, in various exemplary embodiments according to this invention, keyword, key-phrase and sentence based interactive topic-based text summaries are determined for dynamically selected portions of a text. Control then continues to step S10060 where the interactive topic-based text summaries are displayed.

For example, in various exemplary embodiments according to this invention, a human sensible display characteristic such as a '+' character may be used to indicate omitted text. The omitted text indicator may be inserted immediately preceding or immediately following omitted text. In various exemplary embodiments of this invention, the omitted text indicators are selected to dynamically display and/or expand the omitted text. Mouse roll-overs, single right mouse clicks or any known or later selection techniques may be used to select omitted text for expanded display in a separate pop-up window, displayed as an accordion like full text expansion of the associated sentence constituent based interactive topic-based text summary in the current window and the like. Similarly, mouse roll-offs, subsequent mouse clicks or other selection methods may be used to collapse the omitted text associated with the sentence constituent based interactive topic-based text summary. In various exemplary embodiments of this invention, summarized text to be output via a speech synthesizer, dynamic Braille device or using other output display techniques may indicate omitted text by font changes, sound changes, intermittent or varying presence of dynamic Braille output elements or by using any known or later developed human sensible display characteristic. Control then continues to step S10070.

In step S10070 a determination is made whether the user has terminated the session. If the session is not terminated, control jumps immediately to step S10015 and repeats steps S10015-S10070 until the session is terminated at step S10070. When the session is terminated at step S10070, control continues to step S10080 and the process ends.

It will be apparent that in various other exemplary embodiments, multiple different sentence constituent based interactive topic-based text summaries may be displayed and dynamically expanded and/or collapsed without departing from the scope of this invention. Indenting associated with the display of the third and fourth summaries contextually indicate the hierarchical association.

Each of the circuits 10-20 and 40-80 of the system for interactive topic-based text summarization 100 outlined above can be implemented as portions of a suitably programmed general-purpose computer. Alternatively, 10-20 and 40-80 of the system for interactive topic-based text summarization 100 outlined above can be implemented as physically distinct hardware circuits within an ASIC, or using a FPGA, a PDL, a PLA or a PAL, or using discrete logic elements or discrete circuit elements. The particular form each of the circuits 10-20 and 40-80 of the system for interactive topic-based text summarization 100 outlined above will take is a design choice and will be obvious and predicable to those skilled in the art.

Moreover, the system for interactive topic-based text summarization 100 and/or each of the various circuits discussed above can each be implemented as software routines, managers or objects executing on a programmed general purpose computer, a special purpose computer, a microprocessor or the like. In this case, the system for interactive topic-based text summarization 100 and/or each of the various circuits discussed above can each be implemented as one or more routines embedded in the communications network, as a resource residing on a server, or the like. The system for interactive topic-based text summarization 100 and the various circuits discussed above can also be implemented by physically incorporating the system for interactive topic-based text summarization 100 into a software and/or hardware system, such as the hardware and software systems of a web server or a client device.

As shown in FIG. 7, memory 30 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 7 can each be any known or later developed device or system for connecting a communication device to the system for interactive topic-based text summarization 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining sentence based interactive topic-based text summaries comprising the steps of:
dynamically determining a text to summarize;
dynamically determining at least one segment of the determined text to summarize;
dynamically determining at least one discrete sentence based interactive topic-based text summary based on a summary type and a determined segment based on a statistical measure of the segment characterization and segment differentiation;
dynamically determining a subtopic development by recursively repeating the step of determining at least one discrete sentence based interactive topic-based text summary, the subtopic development arranged as a hierarchy including at least one subtopic of the at least one discrete sentence based interactive topic-based text summary;
storing in an electronic memory storage at least one discrete sentence based interactive topic based text summary based on the at least one determined text segment based summary type; and,
displaying the at least one discrete sentence based interactive topic based text summary.

2. The method of claim 1, wherein the statistical measure is a measure of determined segment characterization and other segment differentiation.

3. The method of claim 2, wherein determining the statistical measure comprises the steps of:
determining at least one candidate sentence within a determined segment;
for each at least one candidate sentence, determining the measure of determined segment characterization and other segment differentiation;
ranking the at least one candidate sentence based on the determined measure of current segment characterization and other segment differentiation.

4. The method of claim 3, wherein the at least one other segment is at least one of the n-preceding and m-following segments of the determined segment and where n+m>0.

5. The method of claim 2, wherein the measure of determined segment characterization and other segment differentiation is at least one of mutual information, log odds ratio, $\Pi^2$, $G^2$ distributions.

6. The method of claim 1, further comprising the steps of:
dynamically determining the at least one segment to summarize;
dynamically displaying at least one discrete interactive topic-based text summary based on the at least one dynamically determined segment and wherein a human sensible display characteristic indicates omitted text.

7. The method of claim 6, wherein the human sensible display characteristic is at least one of a visual, auditory, tactile, olfactory and taste characteristic.

8. The method of claim 7, wherein the at least one visual characteristic is at least one of a text font, color, italics, bolding and placement.

9. The method of claim 1, wherein the statistical measure is at least one of four components of mutual information based on presence in a segment and presence in other segments.

10. The method of claim 1, wherein the statistical measure is at least two of four components of mutual information based on presence in the determined segment and presence in other segments.

11. The method of claim 1, further comprising the step of normalizing probabilities based on sentence length.

12. The method of claim 2, wherein determining the statistical measure further comprises the steps of:
determining a function $f_i$ on an indication of the presence of term w1, determining a pointwise mutual information score $I(f_i,r)$ between the determined function $f_i$ and the segment based on the formula:

$$I(f_i, r) = \log \frac{P(f_i|r)}{P(f_i)} = \log \frac{P(f_i, r)}{P(f_i)P(r)};$$

determining an average score for each of the at least one candidate sentences based on an average of the pointwise mutual information scores in the at least one candidate sentences.

13. The method of claim 3, further comprising the steps of:
determining a relative importance score 8 for the presence or absence of a term in a region;
determining a term-region score based on presence ($f_i=1$) of a term in a determined segment r, and absence ($f_i=0$) of the term from other segments (r) based on the following formula $$\text{Score}_{w_i} = \lambda P(f_i=1|r)I(f_i=1,r)+(1-\lambda)P(f_i=0|\neg r)I(f_i=0,\neg r).$$

14. The method of claim 3, where determining candidate scores comprises the steps of:
determining a weighting of term $w_i$ in each candidate sentence;
determining candidate sentence scores based on the formula $$\text{Score}(S) = \sum_{w_i \varepsilon S} P(w_i) \text{Score}(w_i).$$

15. The method of claim 3, further comprising the step of removing inessential elements from at least one of the candidate sentences and the determined summary sentences, based on at least one of syntactic analysis, semantic analysis and statistical filtering.

16. A system for determining sentence based interactive topic-based text summaries comprising:
an input/output circuit for receiving, a selected sentence constituent based summary type, a selected text and a dynamically determined portion of text to summarize;
a processor that retrieves the selected text based on the summary type from the input/output circuit, segments the text and determines a text segment to summarize;

a statistical measure determining circuit for determining a statistical measure of segment characterization and segment differentiation of the at least one determined segment; and wherein the processor segments the text into at least one segment and determines and prepares for display a discrete sentence based interactive topic-based text summary for at least one determined segment based on the statistical measure of the segment;

dynamically determining a subtype development by recursively repeating the step of determining and preparing for display a discrete sentence based interactive topic-based text summary, the subtopic development arranged as a hierarchy including at least one subtopic of the at least one discrete sentence based interactive topic-based text summary.

17. The system of claim 16, wherein the statistical measure is a measure of determined segment characterization and other segment differentiation.

18. The system of claim 17, wherein at least one candidate sentence is determined within a determined segment, and a measure of segment characterization and other segment differentiation is determined for each candidate sentence.

19. The system of claim 18, wherein other segments are at least one of n-preceding text segments of a determined text segment and in-following text segments and where n+m>0.

20. The system of claim 17, wherein the measure of text segment characterization and other segment differentiation is at least one of mutual information, log odds ratio, $\Pi^2$, $G^2$ distributions.

21. The system of claim 16, further comprising a display circuit that displays at least one discrete interactive topic-based text summary based on a dynamic selection of the selected text segment and which display a human sensible display characteristic to indicate omitted text.

22. The system of claim 21, wherein the human sensible display characteristic is at least one of a visual, auditory, tactile, olfactory and taste characteristic.

23. The system of claim 22, wherein the visual characteristic is at least one of text font, text color, text italics, text bolding and placement.

24. The system of claim 16, wherein the statistical measure determining circuit determines at least one of four components of mutual information based on presence in a segment and presence in other segments.

25. The system of claim 16, wherein the statistical measure determining circuit determines at least two of four components of mutual information based on presence in a segment and presence in other segments.

26. The system of claim 16, further comprising a probability normalization circuit that normalizes probabilities based on sentence length.

27. The system of claim 17, wherein the statistical measure determining circuit determines
a function $f_i$ based on an indication of the presence of term $w_i$;
a pointwise mutual information score $I(f_i,r)$ between the determined function $f_i$ and the segment based on the formula:

$$I(f_i, r) = \log\frac{P(f_i|r)}{P(f_i)} = \log\frac{P(f_i, r)}{P(f_i)P(r)};$$

an average score for ranking the at least one candidate sentences based on an average of the pointwise mutual information scores in the at least one candidate sentences.

28. The system of claim 18, wherein the statistical measure determining circuit determines;
a relative importance score 8 for the presence or absence of a term in a region;
a term-region score for ranking candidate sentences based on presence ($f_i$1) of a term in a determined segment r, and absence ($f_i$=0) of the term from other segments ($\Gamma$r) based on the following formula $$\text{Score}_{w_i} = \lambda P(f_i=1|r)I(f_i=1,r)+(1-\lambda)P(f_i=0|\neg r)I(f_i=0,\neg r).$$

29. The system of claim 18, wherein the statistical measure determining circuit determines;
a relative frequency of each of the terms $w_i$ in each candidate sentence; scores for the candidate sentence based on the formula $$\text{Score}(S) = \sum_{w_i \in S} P(w_i)\text{Score}(w_i).$$

30. The system of claim 18, wherein the inessential elements are removed from at least one of the candidate sentences and the determined summary sentences, based on at least one of syntactic analysis, semantic analysis and statistical filtering.

31. Computer readable storage medium comprising: computer readable program code embodied on the computer readable storage medium, the computer readable program code usable to program a computer to determine sentence based interactive topic-based text summaries comprising the steps of:
dynamically determining a text to summarize;
determining at least one segment of the determined text to summarize;
dynamically determining at least one discrete sentence based interactive topic-based text summary based on a summary type and a determined segment based on a statistical measure of the segment characterization and segment differentiation;
dynamically determining a subtopic development by recursively repeating the step of determining at least one discrete sentence based interactive topic-based text summary, the subtopic development arranged as a hierarchy including at least one subtopic of the at least one discrete sentence based interactive topic-based text summary;
preparing for dynamic display of the at least one discrete sentence based interactive topic based text summary based on the at least one text segment of the determined text and the at least one discrete sentence based interactive topic based text summary type.

32. Computer readable storage medium comprising computer readable program code embodied on the computer readable storage medium, the computer readable program code usable to program a computer to determine sentence based interactive topic-based text summaries comprising the steps of:
instructions for dynamically determining a text to summarize;
instructions for dynamically determining at least one segment of the determined text to summarize;

instructions for dynamically determining at least one discrete sentence based interactive topic-based text summary based on a summary type and a determined segment based on a statistical measure of the segment characterization and segment differentiation;

instructions for dynamically determining a subtopic development by recursively repeating the step of determining at least one discrete sentence based interactive topic-based text summary, the subtopic development arranged as a hierarchy including at least one subtopic of the at least one discrete sentence based interactive topic-based text summary;

instructions for preparing for dynamic display of the at least one discrete sentence based interactive topic based text summary based on the at least one text segment of the determined text and the at least one discrete sentence based interactive topic based text summary type.

33. The method of claim 3, further comprising the step of modifying at least one word.

34. The system of claim 18, wherein at least one word is modified.

* * * * *